United States Patent [19]

Fujiki et al.

[11] Patent Number: 5,332,795

[45] Date of Patent: Jul. 26, 1994

[54] SILICONE GEL COMPOSITION EXCELLENT IN DAMPING PROPERTY

[75] Inventors: Hironao Fujiki, Takasaki; Hiroyasu Hara, Annaka, both of Japan

[73] Assignee: Shin-Etsu Chemical Co., Ltd., Tokyo, Japan

[21] Appl. No.: 944,275

[22] Filed: Sep. 14, 1992

[30] Foreign Application Priority Data

Sep. 13, 1991 [JP] Japan .................. 3-262971

[51] Int. Cl.$^5$ .............................. C08G 77/08
[52] U.S. Cl. ......................... 528/15; 528/42; 528/43; 528/31; 528/32; 525/478; 525/479
[58] Field of Search .......... 528/42, 43, 15, 31, 528/32; 525/478

[56] References Cited

U.S. PATENT DOCUMENTS

| | | | |
|---|---|---|---|
| 3,020,260 | 2/1962 | Nelson | 528/15 |
| 4,785,066 | 11/1988 | Maxson | 528/15 |
| 4,801,642 | 1/1989 | Janik | 524/714 |
| 5,268,433 | 12/1993 | Ikeno | 525/478 |

FOREIGN PATENT DOCUMENTS 0069451  1/1983  European Pat. Off. .

OTHER PUBLICATIONS

Patent Abstracts of Japan, vol. 15, No. 31(C-798), Jan. 24, 1991, & JP-A-22-69-771, Hironao Fujiki, et al., "Heat-Resistant Silicone Gel Composition".
Database WPIL, AN 88-081858, May 18, 1988, & JP-A-63-035-655, Feb. 16, 1988, "Silicone Gel Compsn. For Potting, Encapsulation, Etc.—Contains Organo-Polysiloxane, Polyorgano Hydrogen Siloxane and Catalytic Amt. of Platinum, Palladium or Rhodium".
Database WPIL, AN 87-089942, May 27, 1987, & JP-A-62-039.-660, Feb. 20, 1987, "Gel Compsn. for Optical Joint Comprises Poly:Organo:Siloxane, Siloxane and Catalyst for Excellent Adhesion".
Patent Abstracts of Japan, vol. 15, No. 361(C-867), Sep. 12, 1991, & JP-A-31-43-960, Fujiki Hironao, et al., "Silicone Rubber Molding for Insulator".

*Primary Examiner*—John C. Bleutge
*Assistant Examiner*—Margaret W. Glass
*Attorney, Agent, or Firm*—Oblon, Spivak, McClelland, Maier & Neustadt

[57] ABSTRACT

A silicone gel composition, comprising as essential components
(A) an organopolysiloxane comprising substantially 90 to 97 mol % of $R(CH_3)SiO$ units, 0.1 to 2.5 mol % of $RSiO_{1.5}$ units, and 0.1 to 4.0 mol % of $CH_3R(CH_2=CH)SiO_{0.5}$ units, wherein R represents a group selected from the group consisting of a methyl group, a phenyl group, and a $CF_3CH_2CH_2-$ group, provided that the total of the phenyl groups and the $CF_3CH_2CH_2-$ groups out of the R groups amounts to 0.5 to 10 mol % in all the R groups,
(B) a hydrogenpolysiloxane containing at least one silicon-bonded hydrogen atom per molecule in such an amount that the number of the silicon-bonded hydrogen atoms is 0.5 to 1.5 per vinyl group bonded to silicon atoms in the component (A), and
(C) a platinum catalyst. From this composition, a silicone gel excellent damping properties, rapid curability, and low-temperature properties can be obtained.

4 Claims, No Drawings ure of 20 to 10,000
SILICONE GEL COMPOSITION EXCELLENT IN DAMPING PROPERTY

BACKGROUND OF THE INVENTION

1. Field of the Invention

The present invention relates to a silicone gel composition excellent in damping properties.

2. Description of the Prior Art

Hitherto, silicone gellike cured products, i.e., silicone gels are given electric resistance properties and heat dissipation properties and are then used in filling elements such as HIC (hybrid IC) and power modules to protect them. In this application, silicone gels are demanded to be improved in rapid curability which allows the silicone gel to be cured in a short period of time to produce the element efficiently and in low-temperature properties which keep elastic properties even at a low temperature, for example, of about $-60°$ C. and secure high reliability against environments of the application in which the assembled product is used as well as in damping properties for improving vibrating stress resistance of the parts having the elements.

It is known that organopolysiloxanes having $CH_3SiO_{1.5}$ units are good in low-temperature properties, and silicone gel compositions having a base component an organopolysiloxane substantially comprising 80 to 96.5 mol % of $(CH_3)_2SiO$ units, 2.0 to 10.0 mol % of $CH_3SiO_{1.5}$ units, 0.25 to 4.0 mol % of $(CH_3)_2(CH_2=CH)SiO_{0.5}$ units, and 25 to 6.0 mol % of $(CH_3)_3SiO_{0.5}$ units are disclosed, for example, in Japanese Pre-examination Patent Publication (kokai) Nos. 58-7452 (1983) and 62-20557 (1987).

Further, the above Japanese Pre-examination Patent Publication (kokai) No. 58-7452 (1983) describes that it is indispensable for a rapid curing reaction that the above organopolysiloxane has $(CH_3)_2(CH_2=CH)SiO_{0.5}$ units as crosslinking groups for the curing reaction. The above Japanese Pre-examination Patent Publication (kokai) No. 62-20557 (1987) teaches that although the use of a specific amino compound as a reaction retarding agent is useful, even in the case wherein such a reaction retarding agent is used, the pot life of the composition can be remarkably shortened by the blending of a silica processed, for example, with trimethylsilyl groups.

Further, Japanese Pre-examination Patent Publication (kokai) No. 62-181357 (1987) discloses as a composition improved in stability against discoloration and change of hardness due to heat deterioration and stability against adhesiveness a composition comprising (a) 10 to 70 parts by weight of an organopolysiloxane substantially comprising 80 to 98.75 mol % of $(CH_3)_2SiO$ units, 1.0 to 10.0 mol % of $CH_3SiO_{1.5}$ units, 0.25 to 4.0 mol % of $(CH_3)_2(CH_2=CH)SiO_{0.5}$ units, and 0 to 6.0 mol % of $(CH_3)_3SiO_{0.5}$ units and having a viscosity of 20 to 10,000 cSt at a temperature of $25°$ C. and (b) 30 to 90 parts by weight of a polydiorganosiloxane whose both ends are blocked with vinyl groups and which has a viscosity of 100 to 100,000 cSt at $25°$ C. and is basically linear.

However, silicone gels obtained from these known silicone gel compositions cannot satisfy all the demanded properties such as good low-temperature properties and excellent damping properties and cannot satisfy requirements in the above application because, for example, they are slow in curing speed.

SUMMARY OF THE INVENTION

Taking the current state of the above prior art into consideration, an object of the present invention is to provide a silicone gel excellent in damping properties, rapid curability, and low-temperature properties, and a curable composition which can produce said silicone gel.

To attain the above object, the present invention provides a silicone gel composition which will be cured to form a gel, comprising as essential components (A) an organopolysiloxane comprising substantially 90 to 97 mol % of $R(CH_3)SiO$ units, 0.1 to 2.5 mol % of $RSiO_{1.5}$ units, and 0.1 to 4.0 mol % of $CH_3R(CH_2=CH)SiO_{0.5}$ units, wherein R represents a group selected from the group consisting of a methyl group, a phenyl group, and a $CF_3CH_2CH_2-$ group, provided that the total of the phenyl groups and the $CF_3CH_2CH_2-$ groups out of the R groups amounts to 0.5 to 10 mol % in all the R groups, (B) a hydrogenpolysiloxane containing at least one silicon-bonded hydrogen atom per molecule in such an amount that the number of the silicon-bonded hydrogen atoms is 0.5 to 1.5 per vinyl group bonded to silicon atoms in the component (A), and (C) a platinum catalyst.

In the present invention, the term "a silicone gel" means a silicone cured product having a penetration in the range of 0 to 200 measured by using a ¼ Scale Cone in accordance with the method stipulated in ASTM D-1403.

DETAILED DESCRIPTION OF THE INVENTION (A) Vinyl group-containing organopolysiloxanes The vinyl group-containing organopolysiloxane, the component (A), is a base component of the present invention. Owing to this component, improvement of the obtained silicone gel in low-temperature properties and damping properties can be attained. In particular, improvement in these properties is attained where 0.5 to 10 mol %, preferably 3 to 8 mol %, of all the R groups in the above constitutional units is held by the group(s) selected from the group consisting of phenyl groups and $CF_3CH_2CH_2-$groups and and the $RSiO_{1.5}$ units are contained in an amount of 0.1 to 2.5 mol %, preferably 0.3 to 1.0 mol %. If $RSiO_{1.5}$ units are more than 2.5 mol %, although the low-temperature properties of the obtained silicone gel are improved further, the degree of crosslinking of the silicone gel becomes too high to lower the damping properties. Further, if the amount of the phenyl groups or the 3,3,3-trifluoropropyl groups in all the organic groups possessed by this vinyl group-containing organopolysiloxane is increased to more than 10 mol %, the low-temperature properties of the silicone gel are improved further, but the curing speed drops. The organopolysiloxane (A) may further comprises $R(CH_3)_2SiO_{0.5}$ units in an amount of 1 to 10 mol %.

Preferable examples of the vinyl group-containing organopolysiloxane include the following, provided that the content of the phenyl groups falls within the above range: organopolysiloxanes which comprise 0.1 to 1.5 mol % of $(CH_3)_2(CH_2=CH)SiO_{0.5}$ units, 3.0 to 5.0 mol % of $(C_6H_5)(CH_3)SiO$ units, 92 to 97 mol % of $(CH_3)_2SiO$ units, 0.3 to 2.0 mol % of $(CH_3)SiO_{1.5}$ units, and 0.5 to 4.0 mol % of $(CH_3)SiO_{0.5}$ units and have a viscosity of 400 to 4,000 cSt at $25°$ C.

The vinyl group-containing organopolysiloxane, the component (A), can be produced by methods well known to those skilled in the art, for example, by a method wherein a cyclic siloxane such as hexamethylcyclotrisiloxane and octamethyhlcyclotetrasiloxane, a compound containing $RSiO_{1.5}$ units, $CH_3R(CH_2=CH)SiOSiCH_3R(CH_2=CH)$, and $R(CH_3)_2SiORSiR(CH_3)_2$ are mixed and are reacted at a temperature in the rage of 100° to 200° C. using a catalyst such as potassium hydroxide, a quaternary ammonium hydroxide, a quaternary phosphonium hydroxide, or a siloconate compound thereof.

(B) Hydrogenpolysiloxanes

The hydrogenpolysiloxane, the component (B), reacts with the component (A) and acts as a crosslinking agent. Any of hydrogenpolysiloxanes having a linear, cyclic, or branched structure which are conventionally produced can be used without any particular restriction on the molecular structure, if it has at least one silicon-bonded hydrogen atom, preferably 2 or 3 silicon-bonded hydrogen atoms, per molecule.

Groups of this compound other than the silicon-bonded hydrogen atom are groups selected from the group consisting of substituted or unsubstituted hydrocarbon groups having generally 1 to 10 carbon atoms, for example, alkyl groups such as a methyl group, an ethyl group, a propyl group, and a butyl group, aryl groups such as a phenyl group, a tolyl group, and a naphthyl group, aralkyl groups such as a benzyl group and a phenylethyl group, a $CF_3CH_2CH_2-$ group, a $C_8F_{17}CH_2CH_2-$ group, and a $C_2H_5-(OCH_2CH_2)-$ group, preferably a methyl group, a phenyl group, and a $CF_3CH_2CH_2-$ group. The contents of these substituents are arbitrary so long as the number of the silicon-bonded hydrogen atoms meets the above condition.

The amount of the component (B) to be added is such that the number of the silicon-bonded hydrogen atoms in the component (B) is 0.5 to 1.5 per vinyl group contained in the component (A). If the number of said hydrogen atoms is less than 0.5, the crosslink density of the obtainable silicone gel becomes too low and the heat resistance is liable to lower. On the other hand, if the number of said hydrogen atoms is more than 1.5, there is a fear that foaming will occur by the dehydration reaction with the component (A) and also there is a fear that the heat resistance will be influenced adversely.

This hydrogenpolysiloxane can also be produced by methods well known to those skilled in the art. As a quite common manufacturing method, a method can be mentioned wherein, for example, tetrahydrotetramethylcyclotetrasiloxane and/or octamethylcyclotetrasiloxane, a disiloxane having a $(CH_3)_3SiO_{\frac{1}{2}}$ unit or a $H(CH_3)_2SiO_{\frac{1}{2}}$ that can serve as an end group or an organosiloxane oligomer such as $(CH_3)_3SiO(Si(CH_3)_2O)_3$-$Si(CH_3)_3$, etc. are equilibrated in the presence of a catalyst such as sulfuric acid, trifluoromethanesulfonic acid, and methanesulfonic acid at a temperature of about $-10°$ C. to $+40°$ C., which can produce the intended hydrogenpolysiloxane easily.

Examples of the hydrogenpolysiloxane include the following compounds:

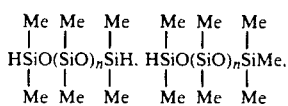

-continued

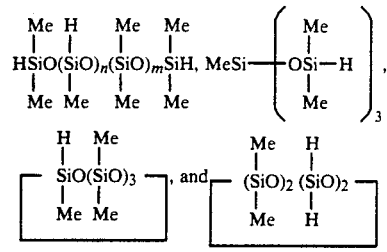

wherein Me stands for a methyl group and n and m are each a positive integer.

(C) Platinum catalysts

The platinum catalyst is a catalyst for promoting the addition reaction (hydrosilylation) of the component (A) and the component (B) and for it any platinum catalyst known to those skilled in the art can be used. Examples include platinum black, chloroplatinic acid, an alcohol-modified chloroplatinic acid, and a complex of chloroplatinic acid with an olefin, an aldehyde, a vinylsiloxane, or an acetylene alcohol. In view of the purity, a complex of chloroplatinic acid with a vinylsiloxane is preferred.

Although the amount of the component (C) may be increased or decreased suitably depending on the desired curing speed, generally the amount is in the range of 0.1 to 500 ppm, preferably 1 to 200 ppm, in terms of platinum based on the component (A). However, if it is required to increase the light transmission of the obtained silicone gel, the smaller the amount is, the more preferable it is, and generally it is suitable that the amount is 1 to 500 ppm.

Other ingredients

Besides the above compositions (A) to (C), if necessary, a curing speed controller and a storage stability controller may be added. Examples thereof include a vinyl group-containing organopolysiloxane such as methylvinylcyclotetrasiloxane, trially isocyanurate, an alkyl maleate, an acetylene alcohol, and its silane-modified product or siloxane-modified product, a hydroperoxide, tetramethylethylenediamine, and benzotriazole. The amount of these compounds to be added is generally 0.01 to 100,000 ppm based on the component (A).

Usage and uses

The present composition is used, for example, by pouring the composition in a container wherein electric parts, electronic parts, etc. have been wired or dipping a wired substrate or the like in a liquid of the composition and then pulling it up therefrom; the composition can be cured by heating at about 100° C. to 180° C. for about 5 min to 1 hour to produce a silicone gel.

That silicone gel is a material with a low stress, rapid curability, low-temperature properties, and damping properties and is useful, for example, as a protective sealing material and an impact absorbing material for electrical and electronic parts such as IC.

EXAMPLES

The present invention will now be described with reference to Examples, but the present invention is not restricted by them. In the following description, the value of the viscosity is that measured at 25° C. and the parts are by weight unless otherwise stated.

EXAMPLE 1

(1) 1.3 g of calcium oxide and 0.88 g of 10%-potassium siliconate were added to 300 g of raw materials consisting of:

| | | |
|---|---|---|
| (a-1) | $[(CH_3)_2SiO]_m$ (m = 3 to 8) | 246.33 g, |
| (a-2) | $[C_6H_5)_2SiO]_n$ (n = 3) | 36.98 g, |
| (a-3) | $[(CH_3)_2SiO]_3CH_3SiO(CH_3)Si[(CH_3)_2SiO]_3$ | 9.41 g, |
| (a-4) | $[CH_2CH(CH_3)(C_6H_5)SiO_{0.5}]_2$ and | 0.88 g, |
| (a-5) | $[(CH_3)_3SiO_{0.5}]_2$ | 6.40 g, | and the polymerization reaction was effected at 150° C. for 9 hours. Thereafter, the temperature was lowered to 30° C., then 8 g of dimethylvinylchlorosilane and 16 g of tetramethyldivinylsiloxane were added, followed by stirring for 2 hours and a neutralization treatment, then low-temperature fractions were distilled off at a distillation temperature of 180° C., and the residue was filtered to obtain an organopolysiloxane (A-1) having a viscosity of 1050 cP. The organopolysiloxane (A-1) consisted of 92 mol % of $(CH_3)_2SiO$ units, 5.0 mol % of $(CH_3)(C_6H_5)SiO$ units, 0.50 mol % of $CH_3SiO_{1.5}$ units, 0.16 mol % of $(CH_2=CH)(C_6H_5)(CH_3)SiO_{0.5}$ units, and 2.34 mol % of $(CH_3)_3SiO_{0.5}$ units, and the content of the phenyl groups described above was 5.16 mol %.

(2) Components of a mixture made up of 0.1 part of a chloroplatinic acid/vinylsiloxane complex (platinum content: 1% by weight), 0.006 part of 1-ethyl-1-hexanol, 0.0012 part of tetramethylethylenediamine, and 4.3 parts of a dimethylpolysiloxane whose ends are blocked with $HMe_2SiO_{0.5}$ units were allowed to come contact with each other for 12 hours at room temperature. Thereafter, to the above organopolysiloxane (A-1) was added the resulting mixture in an amount 5 ppm in terms of platinum based on the organopolysiloxane (A-1) and then 8 parts of a hydrogenpolysiloxane (B) represented by the following formula:

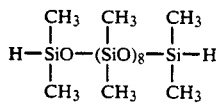

was added per 100 parts of the organopolysiloxane (A-1) as shown in Table 1, and they were mixed uniformly to obtain a curable silicone gel composition. After the silicone gel composition was deaerated, the silicone gel composition was cured by heating at a temperature of 150° C. for 30 min, and the loss tangent by shear vibration in the range of 1 to 500 Hz was measured at room temperature under the conditions that the thickness of the test specimen was 0.25 mm and the vibrational amplitude was 2.5 μm. The results are given in Table 2.

COMPARATIVE EXAMPLE 1

(1) The procedure under (1) in Example 1 was repeated, except that in place of the raw materials (a-1) to (a-5), the following raw materials were used:

| | | |
|---|---|---|
| (a'-1) | $[(CH_3)_2SiO]_m$ (m = 3 to 8) | 228.30 g, |
| (a'-2) | $[(CH_3)_2SiO]_3CH_3SiO(CH_3)Si[(CH_3)_2SiO]_3$ | 61.26 g, |
| (a'-3) | $[CH_2CH(CH_3)(C_6H_5)SiO_{0.5}]_2$ and | 3.09 g, |
| (a'-4) | $[(CH_3)_3SiO_{0.5}]_2$ | 7.35 g, | thereby preparing an organopolysiloxane (A'). This organopolysiloxane (A') consisted of 94.00 mol % of $(CH_3)_2SiO$ units, 3.00 mol % of $CH_3SiO_{1.5}$ units, 0.518 mol % of $(CH_2=CH)(C_6H_6)(CH_3)SiO_{0.5}$ units, and 2.482 mol % of $(CH_3)_3SiO_{0.5}$ units and had a viscosity of 1,300 cP.

(2) The procedure under (2) in Example 1 was repeated, except that in place of the organopolysiloxane (A-1), the organopolysiloxane (A') was used, and the amount of the blended hydrogenpolysiloxane was changed to 9.5 parts per 100 parts of the organopolysiloxane (A') as shown in Table 1, thereby preparing a curable silicone gel composition. A silicone gel was obtained by curing this curable silicone gel composition in the same way as that Example 1 and the loss tangent of the silicone gel by shear vibration was measured in the same way as that Example 1. The results are shown in Table 1.

TABLE 1

| | Example 1 | | Comparative Example |
|---|---|---|---|
| Organopolysiloxane (A): | 100 pts. wt. | Organopolysiloxane (A'): | 100 pts. wt. |
| Hydrogenpolysiloxane (B): | 8.0 pts. wt. | Hydrogenpolysiloxane (B): | 8.0 pts. wt. |
| Concentration of platinum*: | 5 ppm | Concentration of platinum*: | 5 ppm |

*Note: the concentration of platinum is a value per organopolysiloxane (A) or (A').

TABLE 2

| Oscillation frequency (Hz) | Cured product (A) | Cured product (A') |
|---|---|---|
| 1 | −0.5 | −1.1 |
| 5 | −0.35 | −0.95 |
| 10 | −0.2 | −0.65 |
| 50 | −0.1 | −0.35 |
| 100 | −0.01 | −0.25 |
| 500 | 0 | −0.05 |

According to Table 2, in all the frequency ranges at which the measurement was effected, the loss tangent of the silicone gel of Example 1 are greater than those of Comparative Example 1 and it can be understood that the damping properties of the silicone gel of Example 1 are excellent.

COMPARATIVE EXAMPLE 2

0.7 part of a hydrogenpolysiloxane represented by

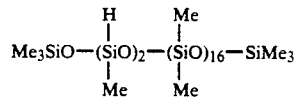

and having a viscosity of 100 cP was added to 100 parts of an organopolysiloxane represented by the following average formula:

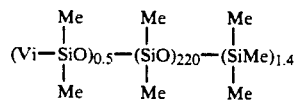

wherein Vi represents a vinyl group and Me represents a methyl group and having a viscosity of 800 cp, and a chloroplatinic acid/2-ethynylcyclohexanol solution was added to the resulting mixture in an amount of 5 ppm in terms of platinum based on the total amount of the above polysiloxanes, followed by mixing uniformly to obtain a curable silicone composition (A″). This composition was cured in the same way as that in Example 1 to obtain a silicone gel.

The penetration of the silicone gel obtained in Example 1 and the silicone gel obtained in Comparative Example 1 under low temperatures was measured using a ¼ Scale Cone in accordance with ASTM D-1403. The results are shown in Table 3.

sition and viscosity of each organopolysiloxane are given in Table 4.

TABLE 4

| | | Organopolysiloxane No. | | | | | | | |
|---|---|---|---|---|---|---|---|---|---|
| | | 1 | 2 | 3 | 4 | 5 | 6 | 7 | 8 |
| $Me_3SiO_{0.5}$ | (mol %) | 2.34 | 2.34 | 2.34 | 2.34 | 2.34 | 2.34 | 2.34 | 2.34 |
| $Vi.Ph.Me.SiO_{0.5}$ | (mol %) | 0.16 | 0.16 | 0.16 | 0.16 | 0.16 | 0.16 | 0.16 | 0.16 |
| $(Me)_2SiO$ | (mol %) | 96.9 | 96.7 | 96.5 | 96.0 | 94.0 | 92.0 | 87.0 | 92.0 |
| Ph.MeSiO | (mol %) | 0.1 | 0.3 | 0.5 | 1.0 | 3.0 | 5.0 | 10.0 | 15.0 |
| $Me.SiO_{1.5}$ | (mol %) | 0.50 | 0.50 | 0.50 | 0.50 | 0.50 | 0.50 | 0.50 | 0.50 |
| Viscosity | (cp) | 700 | 850 | 1,100 | 780 | 1,550 | 830 | 1,970 | 1,410 |

Remarks:
Me stands for the methyl group, Vi stands for the vinyl group, and Ph stands for the phenyl group.

Curable compositions were prepared in the same manner as in Example 1, except that the organopolysiloxane (A) was replaced by one of the organopolysiloxane Nos. 1-8 and the amount of the hydrogenpolysiloxane (B) was changed as shown in Table 5. From each curable composition a silicone gel was prepared in the same manner as in Example 1, and the silicone gel was measured for loss tangent by shear vibration and penetration under low temperatures. The results are given in Table 5.

TABLE 5

| | Organopolysiloxane No. | | | | | | | |
|---|---|---|---|---|---|---|---|---|
| | 1 | 2 | 3 | 4 | 5 | 6 | 7 | 8 |
| Amount of the hydrogen-polysiloxane (part by weight) | 8.3 | 8.3 | 8.2 | 8.1 | 8.0 | 8.0 | 7.9 | 7.9 |
| Loss tangent (Vibration frequency) | | | | | | | | |
| 1 Hz | −0.4 | −0.45 | −0.45 | −0.50 | −0.45 | −0.40 | −0.45 | −0.55 |
| 5 Hz | −0.3 | −0.3 | −0.35 | −0.3 | −0.3 | −0.3 | −0.3 | −0.35 |
| 10 Hz | −0.25 | −0.2 | −0.2 | −0.2 | −0.15 | −0.2 | −0.25 | −0.2 |
| 50 Hz | −0.1 | −0.2 | −0.1 | −0.15 | −0.1 | −0.1 | −0.1 | −0.15 |
| 100 Hz | −0.02 | −0.01 | −0.02 | −0.03 | −0.01 | −0.01 | −0.02 | −0.05 |
| 500 Hz | −0.01 | 0 | −0.01 | −0.02 | 0 | −0.01 | 0 | −0.02 |
| Penetration (Temperature) | | | | | | | | |
| −10° C. | 68 | 76 | 56 | 70 | 67 | 69 | 59 | 72 |
| −20° C. | 67 | 75 | 57 | 69 | 67 | 70 | 59 | 72 |
| −30° C. | 67 | 74 | 56 | 69 | 68 | 69 | 67 | 71 |
| −40° C. | 55 | 74 | 55 | 69 | 65 | 69 | 57 | 65 |
| −50° C. | 40 | 64 | 53 | 67 | 64 | 68 | 55 | 62 |
| −60° C. | 30 | 40 | 50 | 65 | 64 | 68 | 53 | 56 |
| −70° C. | 25 | 30 | 48 | 60 | 60 | 63 | 50 | 40 |

TABLE 3

| | Penetration | |
|---|---|---|
| Temperature (°C.) | Example 1 | Comparative Example 2 |
| −10 | 70 | 65 |
| −20 | 70 | 65 |
| −30 | 71 | 64 |
| −40 | 69 | 64 |
| −50 | 70 | 30 |
| −60 | 68 | 25 |
| −70 | 60 | 20 |

From the results shown in Table 3, it can be understood that the composition of the Example of the present invention gives a silicone gel which keeps its resiliency even under low temperatures, compared with the composition of the Comparative Example that uses a linear polydimethylsiloxane as a base component.

EXAMPLE 3

Eight organopolysiloxanes were prepared similarly to the procedure of Example 1, provided that raw materials and their amounts were appropriately changed for the aimed organopolysiloxanes. The molecular compo-

EXAMPLE 4

A fluorine-containing organopolysiloxane having the molecular composition and viscosity indicated below was prepared in similarly to Example 2, provided that raw materials and there amounts were appropriately changed for the aimed organopolysiloxane.

| Composition | |
|---|---|
| $Me_2Sio$ unit | 92.0 mol % |
| $(Me)(CF_3CH_2CH_2)SiO$ unit | 5.0 mol % |
| $MeSiO_{1.5}$ unit | 0.5 mol % |
| $(Vi)(Ph)(Me)SiO_{0.5}$ unit | 0.16 mol % |
| $Me_3SiO_{0.5}$ unit | 2.34 mol % |
| Viscosity (cp) | 960 |

From the above fluorine-containing organopolysiloxane, a silicone gel was prepared in the same manner as in Example 2, and measured for loss tantent by shear vibration and penetration. The results are given in Table 6.

TABLE 6

| Loss tangent (Frequency) | | Penetration (Temperature) | |
| --- | --- | --- | --- |
| 1 Hz | −0.45 | −10° C. | 65 |
| 5 Hz | −0.3 | −20° C. | 65 |
| 10 Hz | −0.2 | −30° C. | 65 |
| 50 Hz | −0.1 | −40° C. | 64 |
| 100 Hz | −0.01 | −50° C. | 63 |
| 500 Hz | 0 | −60° C. | 61 |
| | | −70° C. | 59 |

We claim:

1. A silicone gel composition which will be cured to form a gel, comprising as essential components:
   (A) 92 to 97 mol % of $(CH_3)_2 SiO$ units, 3.0 to 5.0 mol % of $(C_6H_5)(CH_3) SiO$ units, 0.1 to 1.0 mol % of $(CH_3) SiO_{1.5}$ units, 0.1 to 1.5 mol % of $(CH_3)_2(CH_2=CH)SiO_{0.5}$ units, and 0.5 to 4.0 mol % of $(CH_3)_3 SiO_{0.5}$ units,
   (B) a hydrogenpolysiloxane containing at least one silicon-bonded hydrogen atom per molecule in such an amount that the number of the silicon-bonded hydrogen atoms is 0.5 to 1.5 per vinyl group bonded to silicon atoms in the component (A), and
   (C) a platinum catalyst.

2. A composition as claimed in claim 1, wherein 0.3 to 1.0 mol % of $CH_3SiO_{1.5}$ units are present in component (A).

3. A composition as claimed in claim 1, wherein the component (B), the hydrogenpolysiloxane, comprises at least one selected from the group consisting of

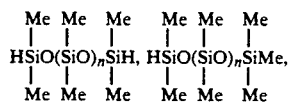

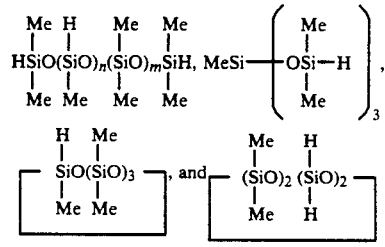

wherein Me stands for a methyl group and n and m are each a positive integer.

4. A silicone gel obtained by curing a composition as claimed in claim 1.

* * * * *